United States Patent

Stich

[11] Patent Number: 5,995,316
[45] Date of Patent: Nov. 30, 1999

[54] INITIALIZATION METHOD AND APPARATUS FOR A RUNOUT CANCELLATION METHOD

[75] Inventor: Michael Charles Stich, Rochester, Minn.

[73] Assignee: Western Digital Corporation, Irvine, Calif.

[21] Appl. No.: 08/921,271

[22] Filed: Aug. 29, 1997

[51] Int. Cl.[6] .................................................. G11B 5/596
[52] U.S. Cl. ...................................... 360/77.04; 360/77.08
[58] Field of Search ............................. 360/77.04, 77.02, 360/77.08, 63, 78.04, 78.09, 78.14

[56] References Cited

U.S. PATENT DOCUMENTS 4,697,127  9/1987  Stich et al. ............................ 360/78.06
5,608,586  3/1997  Sri-Jayantha et al. ................. 360/77.04

Primary Examiner—Andrew L. Sniezek
Attorney, Agent, or Firm—Leo J. Young; Milad G. Shara

[57] ABSTRACT

An initialization for runout cancellation for a hard disk drive such as a Small Computer System Interface (SCSI) hard disk drive. The hard disk drive at a servo sample rate updates a set of state variables. At an index wedge the state variables are stored to a memory. Upon a command to perform a head switch the hard disk reads the previously stored state variables from the memory. The previously stored state variables are used to adjust the repeatable runout based on the location of a head relative to an index wedge.

29 Claims, 8 Drawing Sheets

RUNOUT CANCELER

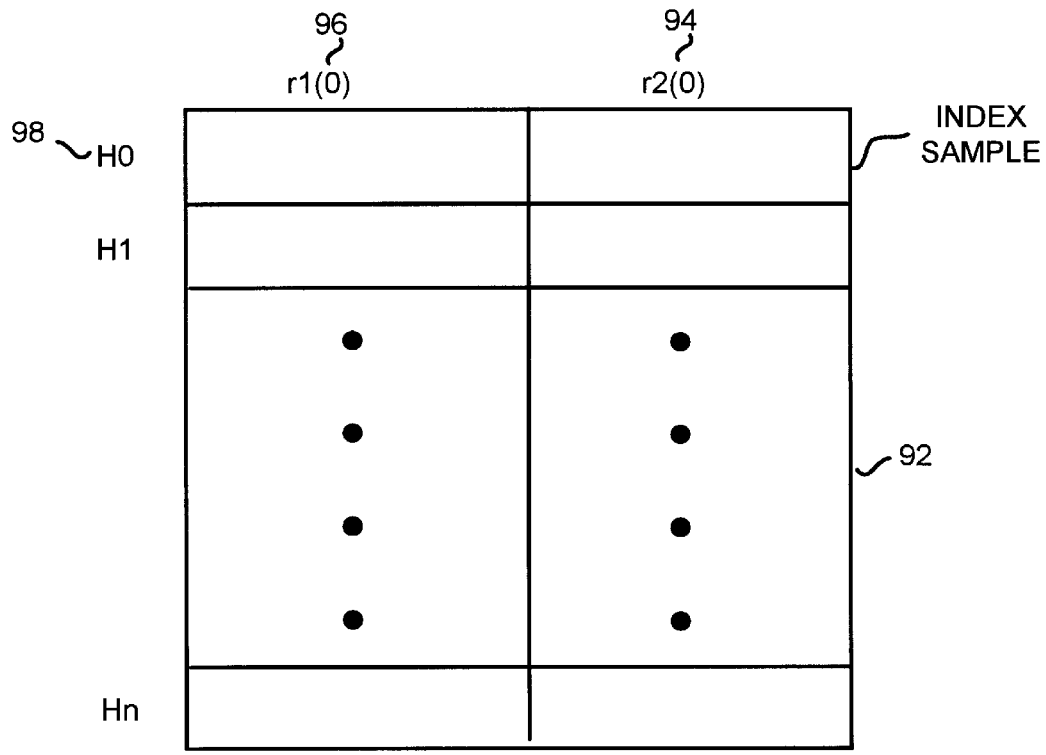
FIG. 5
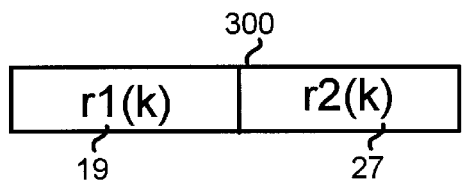
FIG. 9
| Sample (m) | rrotbl |
|---|---|
| 1 | 0 |
| 2 | 1 |
| 3 | $2\cos\theta$ |
| : | : |
| m | $rrotbl(m-2) + 2\cos[(m-2)\theta]$ |
| : | : |
| N+1 | $rrotbl(N-1) + 2\cos[(N-1)\theta]$ |
FIG. 10

INITIALIZATION METHOD AND APPARATUS FOR A RUNOUT CANCELLATION METHOD

NOTICE RE COPYRIGHT

A portion of the disclosure of this patent document contains material which is subject to copyright protection. The copyright owner has no objection to the facsimile reproduction by any one of the patent disclosure, as it appears in the Patent and Trademark Office patent files or records, but otherwise reserves all copyright rights whatsoever.

FIELD OF THE INVENTION

The invention relates to a disk drive having a method and apparatus for runout cancellation and more particularly to a method and apparatus to initialize runout cancellation parameters after a head switch.

BACKGROUND OF THE INVENTION

Hard disk drives use spindle motors to spin a number of magnetic disks past a number of read/write heads. The read/write heads follow tracks on the magnetic disks during track following operations. The spindle motor introduces spindle harmonics into the motion of the magnetic disks. These spindle harmonics cause tracking error known as "repeatable runout." Eliminating the repeatable runout from the tracking error in a disk drive is a common problem facing the hard disk drive designer. Conventional methods use an algorithm which measures the amplitude and phase of the repeatable runout to be eliminated or canceled. A feedforward signal based on the measured phase and amplitude is injected into the system that causes the head to track the disk motion for that harmonic, eliminating it from the tracking error. The injected signal can be calculated from parameters of the control system, or the measurement can be made repeatedly and an approximate injection signal refined over several iterations until the repeatable runout is reduced to an acceptable level. This process is repeated for each head, and the magnitude and phase is stored in memory during a calibration procedure that is done during drive power up, and possibly other defined times. These values are then used whenever the head is selected.

A disadvantage to these systems is that the repeatable runout may change phase and magnitude during normal operation of the drive. Temperature changes are the most likely cause of such shifts. This causes the previous calibration and cancellation of the runout to be wrong, possibly making it worse than if there were no cancellation at all. This requires the drive to either periodically initiate a calibration to detect any changes, or to use an error detecting scheme to decide when to calibrate. In either case, the normal operation of the drive is interrupted, since the calibration can take on the order of seconds to complete.

Schemes that accomplish a continuous cancellation of a repeatable signal are well known. These methods add two state variables that form an oscillator with feedback that conceptually works as an integrator does to eliminate DC bias. This oscillator integrates the error at the harmonic frequency and applies a canceling drive to the actuator, the advantage being that it operates continuously and responds to any changes in the harmonic at a rate that is determined by the normal control system tuning procedures. The cancellation scheme is integrated seamlessly with a standard state space design, allowing for all the well known design procedures to be applied, such as pole placement. Since it adapts itself to the magnitude and phase of the harmonic continuously, the need for an initial calibration procedure is eliminated.

A difficulty arises during initialization of these state variables when a new head is selected—i.e. a head switch is performed. After a new head is selected, the canceler states still apply to the prior head because each head represents a new gain factor in the system. Thus, without initialization, the canceler does not remove the runout error. Further, the state variables are applied according to the angular location of an upcoming servo wedge in a sampled servo system. Considering that there may be 60 or more servo wedges dispersed along a track, and perhaps 4 or more heads, the time and storage requirements for initialization of the variables is significant.

What is needed is a method for initializing the states of the repeatable runout canceler in a digital control system when switching heads that is efficient from a time and storage perspective.

SUMMARY OF THE INVENTION

The invention provides a method of operating a sampled signal head positioning servo system in a disk drive having first and second heads and multiple rotating recording surfaces wherein each recording surface has multiple sequentially-active servo wedges. During track following operations, including such operations during which a head switch occurs, the servo system produces a position error signal and a control signal for use in minimizing the position error signal. The invention includes a programmable processor for repeatedly calculating, at a servo sample rate, an updated value for the control signal based on a current value of the position error signal. A first table stores values for a multi-dimensional state variable, the first table being readable and writable by the processor for use at the servo sample rate in repeatedly calculating the updated value for the control signal during a track following operation. A second table stores values for the multi-dimensional state variable, the second table being readable by the processor for use in an initialization operation performed when a head switch occurs. A third table stores coefficients readable by the processor. A first predetermined location stores a current value for a first runout cancellation variable. A second predetermined location stores a current value for a second runout cancellation variable. A predetermined one of the servo wedges serves as an index wedge. The invention repeatedly performs an updating operation during a track following operation wherein each updating operation includes producing an updated value for the second runout cancellation variable. During the updating operation the invention first reads the first table to provide operands and the third table to provide coefficients, second the invention uses the operands and the coefficients to calculate updated values for the multi-dimensional state variable and to calculate an updated value for the runout cancellation variable, and third the invention writes the updated values for the multi-dimensional state variable to replace previous values in the first table. When a head switch occurs from the first head to the second head, the invention performs an initialization operation. The initialization operation proceeds by producing a calculated address to the third table based on the relative order, relative to the index wedge, of the next servo wedge to be active, then reads from the calculated address of the third table to obtain coefficients, and uses selected operands from the second table and the selected coefficients to calculate updated values for the multi-dimensional state variable.

Alternatively, the invention may be thought of as a disk drive having a sampled signal head positioning servo system apparatus comprising a first head and a second head and multiple rotating recording surfaces wherein each recording surface has multiple sequentially-active servo wedges, and wherein, during track following operations, including such operations during which a head switch occurs, the sampled signal head positioning servo system apparatus produces a position error signal and a control signal for use in minimizing the position error signal and includes a programmable processor for repeatedly calculating, at a servo sample rate, an updated value for the control signal based on a current value of the position error signal. The apparatus further comprises a first table for values for a multi-dimensional state variable, the first table being readable and writable by the programmable processor for use at the servo sample rate in repeatedly calculating the updated value for the control signal during a track following operation; a second table for generating values for the multi-dimensional state variable, the values being readable by the programmable processor for use in an initialization operation performed when a head switch occurs; a means for generating selected coefficients readable by the programmable processor; a first predetermined location for storing a current value for a first runout cancellation variable; a second predetermined location for storing a current value for a second runout cancellation variable; a means for identifying a predetermined one of the multiple sequentially-active servo wedges to serve as an index wedge; a means for repeatedly performing an updating operation during a track following operation wherein each updating operation including producing an updated value for runout cancellation by reading the first table and the first predetermined location to provide operands, using the operands to calculate updated values for the multi-dimensional state variable and to calculate an updated value for the second runout cancellation variable, and writing the updated values for the multi-dimensional state variable to replace previous values in the first table; means for detecting when a head switch occurs from the first head to the second head; means for performing the initialization operation comprising means for producing a calculated address to the second table indexed by the second head, means for reading from the calculated address of the second table to obtain operands; means for using the selected coefficients and the selected operands to calculate updated values for the multi-dimensional state variable.

The third table may be calculated from a preexisting sine table by applying a scaling factor in order to conserve memory, or may be explicitly generated.

BRIEF DESCRIPTION OF THE DRAWINGS

FIG. 5 shows an example state variable table of the invention.

FIG. 9 shows an example table of the invention for current runout canceler state variables.

FIG. 10 shows an example table of the invention for coefficients for each servo sample.

DETAILED DESCRIPTION OF THE PREFERRED EMBODIMENT

Figure 1:
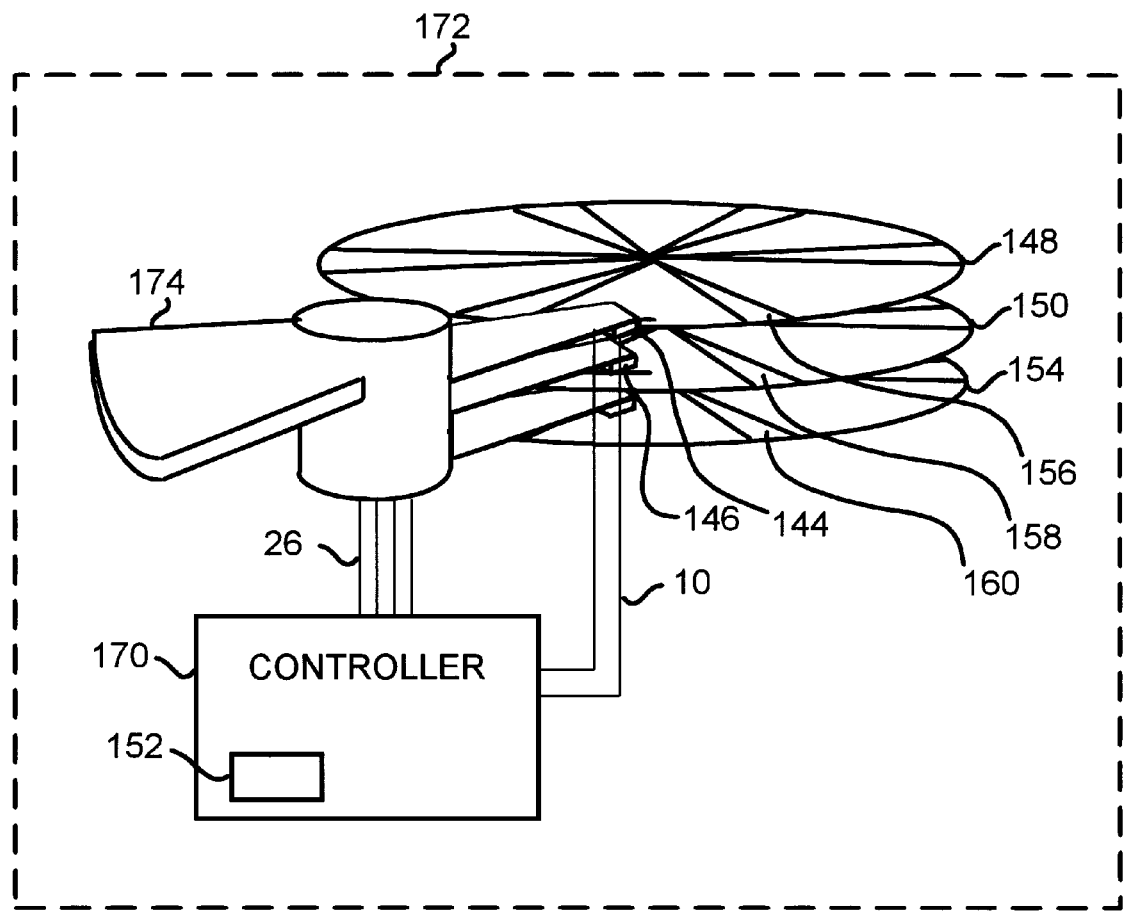
FIG. 1 shows a sampled signal head positioning servo system in a disk drive.

Refer now to FIG. 1 which shows a sampled signal head positioning servo system 170 in a disk drive 172 having a first head 144 and a second head 146 and multiple rotating recording surfaces 148, 150, and 154. The disk drive 172 may advantageously comprise a disk drive conforming to the Small Computer System Interface standard (SCSI). Each recording surface has multiple sequentially-active servo wedges 156, 158 and 160. During track following operations, including such operations during which a head switch occurs, the servo system produces a position error signal 10 and a control signal 26 applied to actuator 174 for use in minimizing the position error signal 10. The sampled signal head positioning servo system 170 includes a programmable processor 152 for repeatedly calculating, at a servo sample rate, an updated value for the control signal 26 based on a current value of the position error signal 10.

Figure 2:
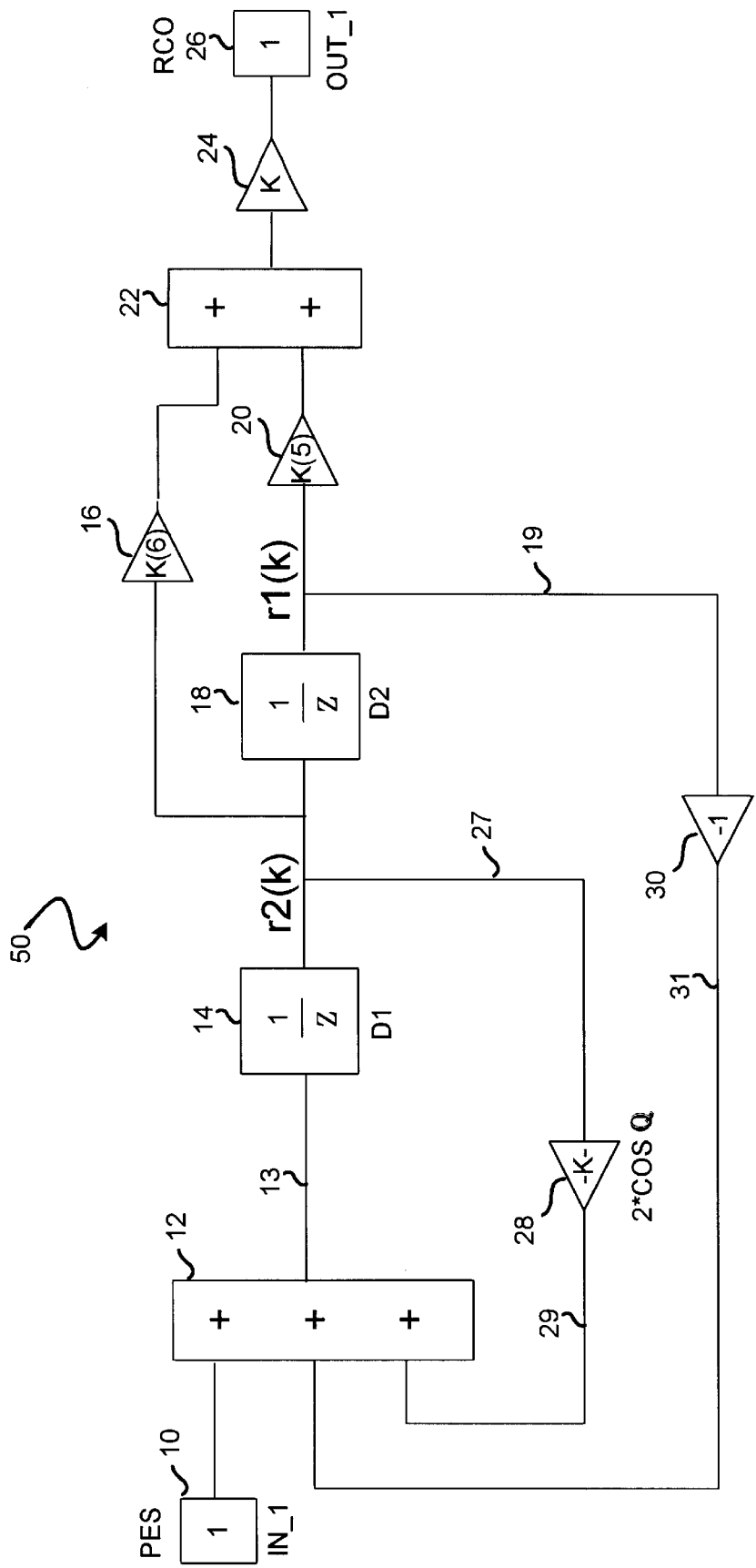
FIG. 2 shows the runout canceler of the invention.

Refer now to FIG. 2 which shows a schematic block diagram of the runout canceler 50 of the invention. The runout canceler 50 receives a first runout cancellation variable comprising a position error signal at terminal IN__1, PES 10, from the servo system 170 head demodulator 36 shown in FIG. 3. The PES 10 is added to two feed back signals 31,29 to generate an input 13 to a signal delay element 14 that stores the current value of the output of summer 12. The signal delay element 14 provides an output $r_2(k)$ 27 that represents the value of the output of the summer 12 on a previous cycle. The signal delay element stores the output value of the summer 12 at time t and outputs the output value of the summer 12 at time t−1. The output $r_2(k)$ 27 of the signal delay element 14 is known as a first state variable of the runout canceler system, providing a z domain operator useful as a modeling parameter. The output $r_2(k)$ 27 is then further processed by a second signal delay element 18 that generates an output $r_1(k)$ 19 that is known as a second state variable, also providing a z domain operator for use in the model. Similarly the output $r_1(k)$ 19 of signal delay element 18 is a one cycle delayed version of the input to signal delay element 18. The signal delay element may be a memory such as a random access memory or a latch such as a data latch.

Feedback signal 31 originates from a signal processing node 30 that multiplies the output $r_1(k)$ 19 by −1. A second feed back signal 29 originates from a signal processing node 28 that multiplies the output $r_2(k)$ 27 by $2*\cos\theta$ where $\theta$ is the parameter that allows the frequency to be controlled. Gain stage K(6) 16 has as its input the output $r_2(k)$ 27 of signal delay element 14. Gain stage K(5) 20 has as its input the output $r_1(k)$ 19 of signal delay element 18. The values of the K(5) and K(6) gain stages are matched to an oscillator that runs at a predefined frequency and are chosen as design parameters using simulation in a well known iterative process. Summer 22 sums the output of gain stage K(6) 16 and gain stage K(5) 20 and feeds gain stage 24. The runout canceler output RCO 26 at terminal OUT__1 is adjusted by a predetermined gain in gain stage 24 and forms a second runout cancellation variable.

The state variables $r_2(k)$ and $r_1(k)$ fully describe the operation of the runout canceler 50 at any discrete angular position. The angular position of a read/write head relative to a magnetic disk can be likened to the sample number or the number of servo samples taken from the index wedge. Since the sample number is known when a head switch occurs, if the states are initialized to the proper values for that sample on the new head, the settling time of the system to the harmonic can be minimized.

Saving the two states for an entire revolution of the disk for each head would require considerable memory because a disk track typically has 60 or more servo wedges and 4 or more heads. The memory available to store parameters is limited due to the economics of disk drives. The invention advantageously reduces the amount of memory required for storing runout canceler parameters by only requiring two memory locations per head.

Refer to FIG. 5 which shows the state variable table 92 of the invention for use in initialization after a head switch. The state variable table 92 is indexed by head number 98. The state variable table 92 stores two values for each head number 98, a first state variable $r_1(0)$ 96 and a second state variable $r_2(0)$ 94 referenced, for example, to the index servo wedge sample.

The invention preferably uses a table 200 of coefficients 204 of N+1 samples 202 shown in FIG. 10, where N is the number of samples per revolution, that can be used to calculate the state values as described below.

The state values of $r_1(k)$ 19 and $r_2(k)$ 27 are setup during a head switch based on stored initialization values of table 92. Theta ($\theta$) is a parameter that determines the frequency to be controlled. Theta ($\theta$) is fixed for a particular disk drive design and is based on the operational angular velocity of the magnetic disk. The state equation for the runout canceler of the invention is:
and the output equation is:

$$out\_1 = K[K(5)\ K(6)]\begin{bmatrix} r_1(k) \\ r_2(k) \end{bmatrix} \qquad \text{Eq. 2}$$

$$\begin{bmatrix} r_1(k+1) \\ r_2(k+1) \end{bmatrix} = \begin{bmatrix} 0 & 1 \\ -1 & 2\cos\theta \end{bmatrix}\begin{bmatrix} r_1(k) \\ r_2(k) \end{bmatrix} + \begin{bmatrix} 0 \\ 1 \end{bmatrix}in\_1 \qquad \text{Eq. 1}$$

To move the state forward in time from a reference sample on the disk, such as an index wedge, assume the runout canceler had reached steady state and the multi-dimensional state variables were stored in a table of current state variables such as table 300 shown in FIG. 9 including multi-dimensional state variables 19 and 27, some time before. Since the system had reached steady state, the invention assumes that the input was zero at the design frequency. Define $$\Phi = \begin{bmatrix} 0 & 1 \\ -1 & 2\cos\theta \end{bmatrix} \text{ and } r(k) = \begin{bmatrix} r_1(k) \\ r_2(k) \end{bmatrix} \qquad \text{Eq. 3}$$

Then to move the states forward in time with PES 10 (IN_1)=0:

$$r(k+n) = \phi^n r(k).$$

To move the states forward in time to any point on the revolution, the invention calculates the powers of up to one less than the number of the samples on the disk. By noting patterns in the algebraic equations the following may be derived:

$$\Phi^2 = \begin{bmatrix} -1 & 2\cos\theta \\ -2\cos\theta & -1+4\cos^2\theta \end{bmatrix} \qquad \text{Eq. 3}$$

$$\Phi^3 = \begin{bmatrix} -2\cos\theta & -1+4\cos^2\theta \\ 1-4\cos^2\theta & -4\cos\theta+8\cos^3\theta \end{bmatrix} \qquad \text{Eq. 5}$$

$$\Phi^4 = \begin{bmatrix} 1-4\cos^2\theta & -4\cos\theta+8\cos^3\theta \\ 4\cos\theta-8\cos^3\theta & 1-12\cos^2\theta+16\cos^4\theta \end{bmatrix} \qquad \text{Eq. 6}$$

Up to $\Phi^{N-1}$

Applying standard trigonometry identities for multiple angle and power relations, the sequence can be simplified as follows. $\phi^1$ is included to help make the pattern clear.

$$\Phi^1 = \begin{bmatrix} 0 & 1 \\ -1 & 2\cos\theta \end{bmatrix} \qquad \text{Eq. 7}$$

$$\Phi^2 = \begin{bmatrix} -1 & 2\cos\theta \\ -2\cos\theta & 1+2\cos2\theta \end{bmatrix} \qquad \text{Eq. 8}$$

$$\Phi^3 = \begin{bmatrix} -2\cos\theta & 1+2\cos2\theta \\ -1-2\cos2\theta & 2\cos\theta+2\cos3\theta \end{bmatrix} \qquad \text{Eq. 9}$$

$$\Phi^4 = \begin{bmatrix} -1-2\cos2\theta & 2\cos\theta+2\cos3\theta \\ -2\cos\theta-2\cos3\theta & 1+2\cos2\theta+2\cos4\theta \end{bmatrix} \qquad \text{Eq. 10}$$

$$\Phi^5 = \begin{bmatrix} -2\cos\theta-2\cos3\theta & 1+2\cos2\theta+2\cos4\theta \\ -1-2\cos2\theta-2\cos4\theta & 2\cos\theta+2\cos3\theta+2\cos5\theta \end{bmatrix} \qquad \text{Eq. 11}$$

$$\Phi^6 = \begin{bmatrix} -1-2\cos2\theta-2\cos4\theta & 2\cos\theta+2\cos3\theta+2\cos5\theta \\ -2\cos\theta-2\cos3\theta-2\cos5\theta & 1+2\cos2\theta+2\cos4\theta+2\cos6\theta \end{bmatrix} \qquad \text{Eq. 12}$$

$$\vdots$$

Observing the pattern for the 2,2 element, for even n $$\Phi^n(2,2) = 1 + 2\sum_{i=1}^{n/2} \cos(2i\theta) \quad n = 2, 4, 6 \ldots \qquad \text{Eq. 13}$$

and for odd n $$\Phi^n(2,2) = 1 + 2\sum_{i=1}^{\frac{n+1}{2}} \cos((2i-1)\theta) \quad n = 1, 3, 5 \ldots \qquad \text{Eq. 14}$$

It can also be noted that $\phi^n(1,2) = -\phi^n(2,1)$. For $n \geq 2$, the following relationships hold for successive powers of $\phi$.

$$\phi^n(1,2) = \phi^{n-1}(2,2) \text{ and } \phi^n(1,1) = -\phi^{n-1}(1,2) = -\phi^{n-2}(2,2).$$

While it would be possible for the control processor to calculate the cosine values from a table that already exists in memory, the number of terms involved would require a considerable amount of time to calculate states for even a moderate number n. Thus it is more efficient to exploit the structure of the matrix and create a moderately small table of N+1 values for the $\phi^n(2,2)$ element such as table 200 in FIG. 10. The other required elements may be constructed from this small table.

Figure 6:
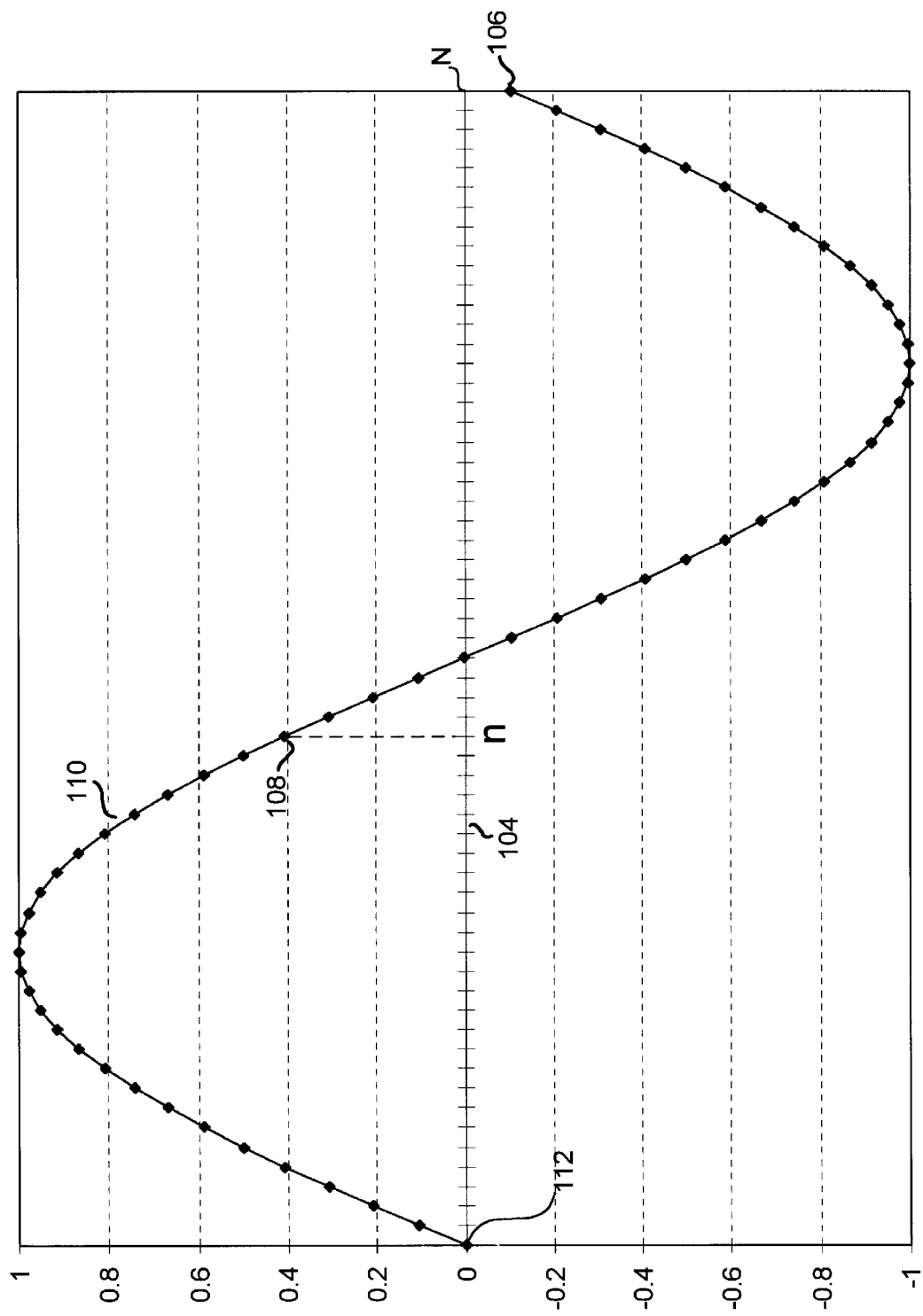
FIG. 6 shows a plot of runout versus sectors from the index wedge.

Refer also to FIG. 6 which shows a graph of repeatable runout 110 as a function of sample periods or sectors 104 on the magnetic disk. The repeatable runout curve 110 repeats every revolution of the disk. At the index wedge 112 the values of the multi-dimensional state variables $r_1(k)$ and $r_2(k)$ are stored. At sector n 108, n sectors from the index wedge 112 the disk drive performs a head switch. The Nth sample period, or sector 106 represents the last sample or sector in the runout cycle.

The repeatable runout coefficient table 200 is defined as follows.

rrotbl(1)=0 rrotbl(2)=1 rrotbl(k+2)=rrotbl(k)+2cos $k\theta$ k=1,2, . . . N-1

To advance the runout canceler states n sample periods, where $1 \leq n \leq N-1$ the following equations are used.

$$\begin{bmatrix} r_1(k+n) \\ r_2(k+n) \end{bmatrix} = \begin{bmatrix} -rrotbl(n) & rrotbl(n+1) \\ -rrotbl(n+1) & rrotbl(n+2) \end{bmatrix} \begin{bmatrix} r_1(k) \\ r_2(k) \end{bmatrix} \qquad \text{Eq. 15}$$

These equations are easily calculated in the control processor 152 in a short time whenever a head switch is performed to initialize the runout canceler to the upcoming sample. The states for a given head can be saved to two memory locations such as 96 and 94 at each index time while the system is following a track on that head during normal operation. These index states on the new head are then used in Equation 15 as:

$$\begin{bmatrix} r_1(k) \\ r_2(k) \end{bmatrix}$$

when returning to that head along with the number of samples from index, n, to calculate the desired states on the new head at the next sample time $$\begin{bmatrix} r_1(k+n) \\ r_2(k+n) \end{bmatrix}.$$

It can be shown that the rrotbl has the form of a sine wave. If there is a pre-existing sine table of unit magnitude for use in other aspects of disk drive control, an alternative preferred embodiment uses the sine table with an appropriate scaling factor instead of the rrotbl described above.

The first few terms of the rrotbl are:

0  1  $2\cos\theta$  $1+2\cos 2\theta$  ...

whereas the terms of the sine table in memory (SinTbl) are:

0  $\sin\theta$  $\sin 2\theta$  $\sin 3\theta$  ...  $\sin[(N-1)\theta]$

To use the sine table, simply multiply it by $1/\sin\theta$. Thus Equation 15 becomes:

$$\begin{bmatrix} r_1(k+n) \\ r_2(k+n) \end{bmatrix} = \frac{1}{\sin\theta} \begin{bmatrix} -\text{SinTbl}(n) & \text{SinTbl}(n+1) \\ -\text{SinTbl}(n+1) & \text{SinTbl}(n+1) \end{bmatrix} \begin{bmatrix} r1(k) \\ r2(k) \end{bmatrix} \qquad \text{Eq. 16}$$

Figure 3:
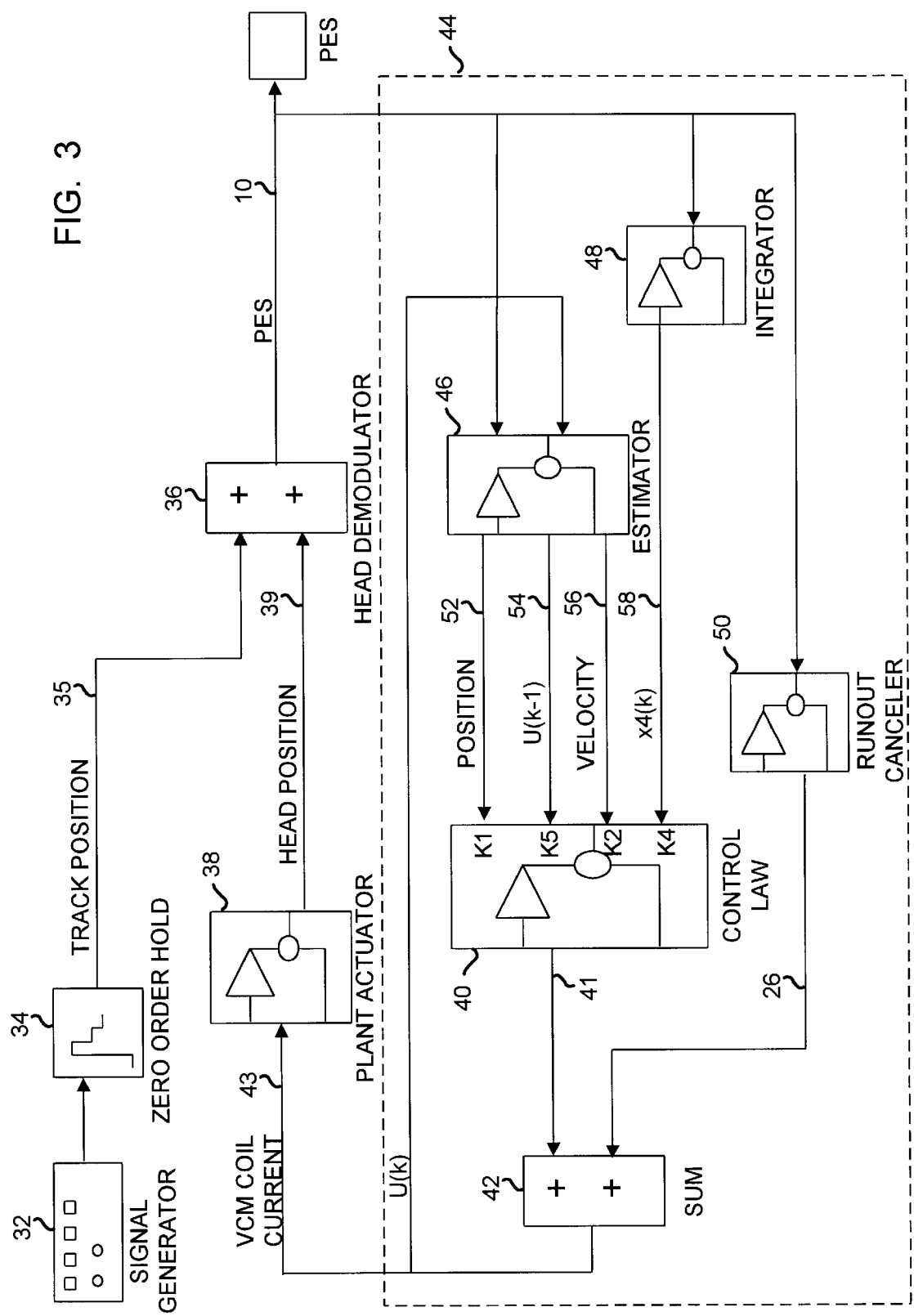
FIG. 3 shows a schematic block diagram of the plant and repetitive controller of the invention.

Refer now to FIG. 3 which shows the runout canceler of the invention modeled in the disk plant. A track position signal 35 originates in a zero-order hold 34 from a signal generator 32 in a conventional fashion. The track position signal is combined with the head position signal 39 in head demodulator 36. Head/demodulator 36 generates the PES 10. The head position signal 39 is received from the head as positioned by the plant actuator 38. The plant actuator 38 is in turn controlled by a voice coil motor (VCM) (not shown) driven by coil current control signal 43 in a well known manner. The VCM coil current control signal 43 is generated by the repetitive controller 44 implemented as a digital signal processor. The repetitive controller 44 feeds the VCM coil current control signal 43 and the PES 10 back to an estimator 46 that generates three control signals: position 52, U(k-1) 54, and velocity 56. An integrator 48 removes DC bias from the PES 10 to generate the x4(k) 58 control signal. These control signals are used by a control law 40 to generate a control signal 41 that is adjusted by the runout canceler 50 output 26 in summer 42. Summer 42 generates the VCM Coil current control signal 43.

Figure 4:
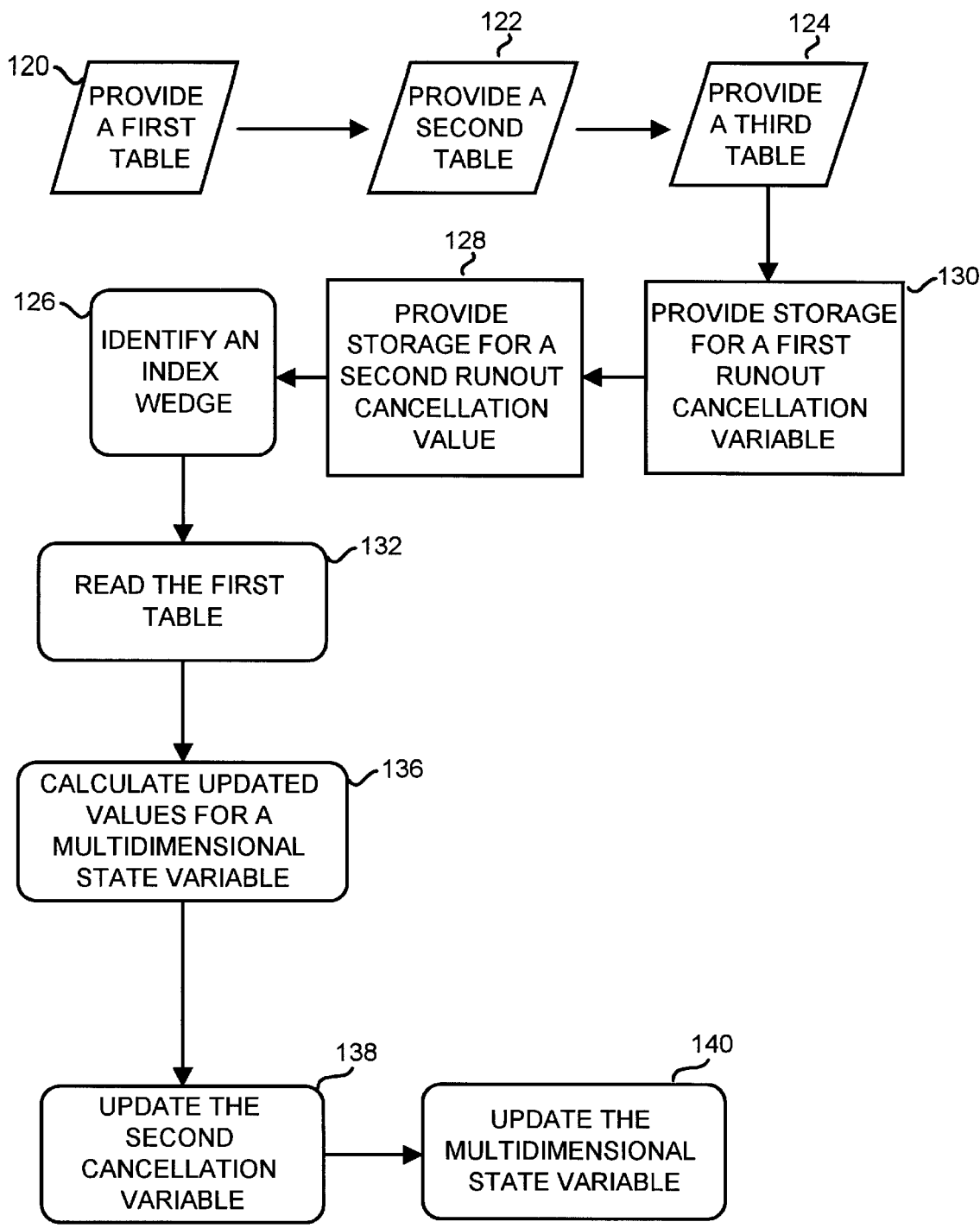
FIG. 4 shows the method of the invention to calculate an updated value for the multi-dimensional variable.

Now refer to FIG. 4 which shows the method of the invention to calculate an updated value for the multi-dimensional variable. In step 120 a first table 300 stores values for a multidimensional state variable, $r_1(k)$ 19 and $r_2(k)$ 27. The first table 300 is readable and writable by the processor 152 for use at the servo sample rate in repeatedly calculating the updated value for the control signals 26 during a track following operation. In step 122 a second table 92 readable by the processor 152 stores reference values for $r_1(k)$ 19 and $r_2(k)$ 27 at the index wedge for calculating the multidimensional state variable when a head switch occurs. In step 124 a third table 200 stores coefficients readable by the processor 152. In step 130, a first predetermined location stores a current value for a first runout cancellation variable, PES 10. In step 128, a second predetermined location stores a current value for a second runout cancellation variable, output 26. In step 126 a predetermined one of the servo wedges serves as an index wedge. In step 132 the invention reads from the first table to obtain current operand values for the multi-dimensional state variable. In step 136 the invention uses the operands to calculate updated values for the multi-dimensional state variable and to calculate an updated value for the runout cancellation variable output 26. In step 138 the invention writes the updated value for the runout cancellation variable output 26 in the second storage location. In step 140 the invention writes the updated values for the multi-dimensional state variable to replace previous values in the first table.

Figure 7:
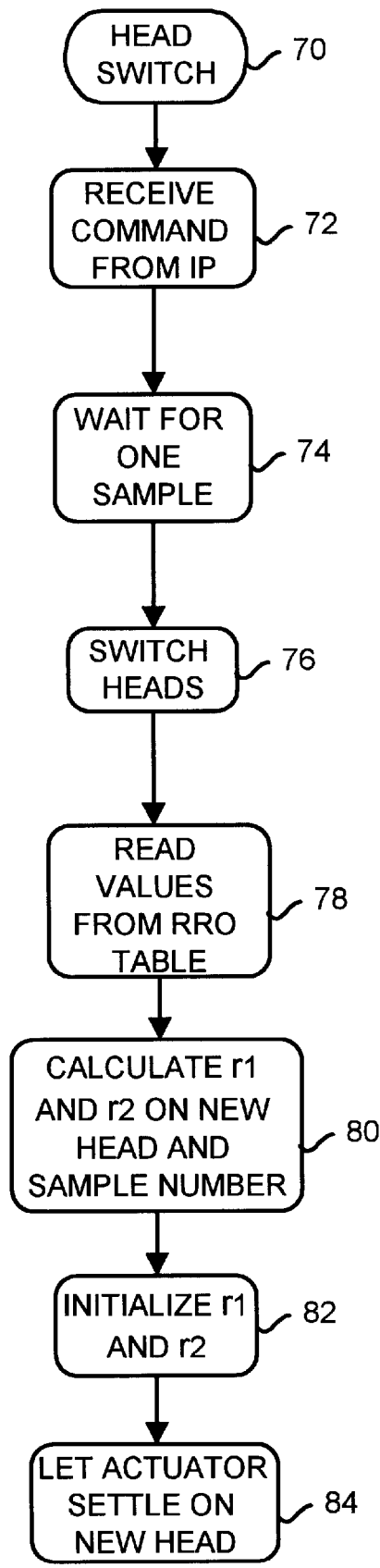
FIG. 7 shows the method of the invention to switch heads.

Refer now to FIG. 7 which shows the method of the invention to switch heads 70. During a head switch the disk drive begins reading and writing data from a different head that will start track following a different magnetic disk. Upon a command to perform a head switch 72 the disk drive waits for one sample period to occur in step 74. This sample period is at the servo sample rate. The heads are electronically switched in step 76. To correctly track follow with the new head the state variables that define the canceler must be initialized. The repeatable runout values for the new head are read from the state variable table 92 in step 78. In step 80 the new $r_1$ and $r_2$ state variable values are computed for the new head and sample number following the equations defined above. The state values $r_1$ and $r_2$ are then used to initialize the repeatable runout state variables in step 82. In step 84 the system waits for the actuator to settle after the new head switch for a predetermined amount of time.

Figure 8:
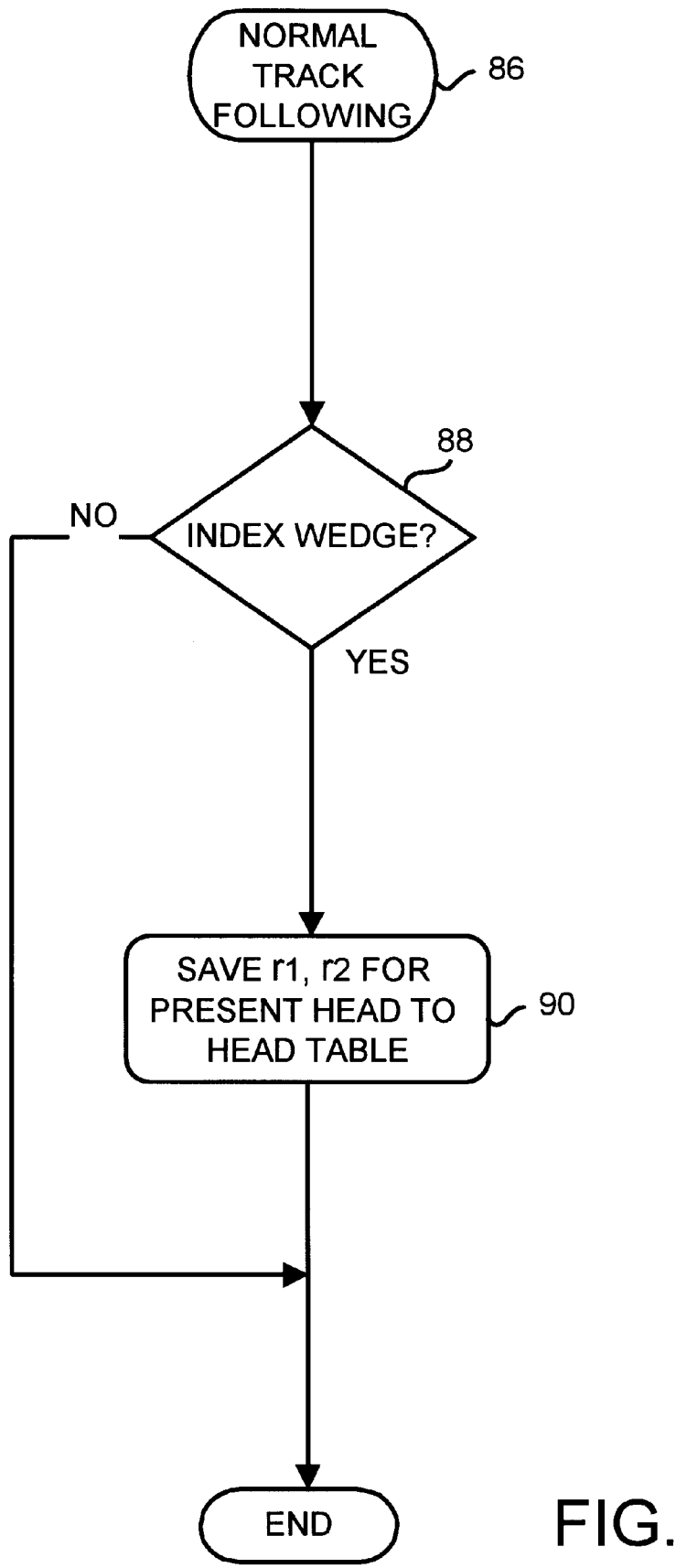
FIG. 8 shows the method of the invention to save state variables to a state variable table.

Refer now to FIG. 8 which shows the method of the invention to store a state variable to the state variable table. To provide a reference point for the calculation of the $r_1$ and $r_2$ state variable values a position of the magnetic disk is chosen. The index wedge is chosen for this position. In step 86 the disk drive is performing normal track following operations. In step 88 the system checks for the index wedge. If the drive is at the index wedge the system saves the state variables $r_1$ and $r_2$ to the state variable table 92 in step 90. Preferably, the values of state variables $r_1$ and $r_2$, saved in table 92, may be averaged over several revolutions of the disk. The number of samples to average is determined empirically, however the inventor has found that in a given instance four samples is satisfactory. The state variable table 92 is now updated and ready to provide reference values of the state variables $r_1$ and $r_2$ for a head switch.

Appendix A shows a listing of the methods of the invention implemented in TMS320™ assembler programming language.

I claim:

1. A method of operating a sampled signal head positioning servo system in a disk drive having first and second heads and multiple rotating recording surfaces wherein each recording surface has multiple sequentially-active servo wedges, and wherein, during track following operations, including such operations during which a head switch occurs, the sampled signal head positioning servo system produces a position error signal and a control signal for use in minimizing the position error signal and includes a programmable processor for repeatedly calculating, at a servo sample rate, an updated value for the control signal based on a current value of the position error signal, the method comprising the steps of:

a) providing a first table for values for a multi-dimensional state variable, the first table being readable and writable by the programmable processor for use at the servo sample rate in repeatedly calculating the updated value for the control signal during a track following operation;

b) providing a second table for values for the multi-dimensional state variable, the second table being readable by the programmable processor for use in an initialization operation performed when a head switch occurs;

c) providing a third table, readable by the programmable processor, for use in obtaining coefficients when a head switch occurs;

d) providing a first predetermined location for storing a current value for a first runout cancellation variable;

e) providing a second predetermined location for storing a current value for a second runout cancellation variable;

f) identifying a predetermined one of the multiple sequentially-active servo wedges to serve as an index wedge;

g) repeatedly performing an updating operation during a track following operation wherein each updating operation including producing an updated value for runout cancellation by steps including, reading the first table to provide operands to calculate updated values for the multi-dimensional state variable and to calculate an updated value for the second runout cancellation variable, and writing the updated values for the multi-dimensional state variable to replace previous values in the first table; and h) when a head switch occurs from the first head to the second head, performing the initialization operation by steps including producing a calculated address to the third table based on a relative order, relative to the index wedge, of a next servo wedge to be active, reading from the calculated address of the third table to obtain selected coefficients, reading the second table to obtain operands, and using the selected coefficients and the operands to calculate updated values for the multi-dimensional state variable.

2. The method of claim 1 wherein the programmable processor further comprises a digital signal processor.

3. The method of claim I wherein the disk drive comprises a SCSI drive.

4. The method of claim 1 wherein the step of calculating updated values for the multi-dimensional state variable further comprises the following equation:

$$\begin{bmatrix} r_1(k+1) \\ r_2(k+1) \end{bmatrix} = \begin{bmatrix} 0 & 1 \\ -1 & 2\cos\theta \end{bmatrix} \begin{bmatrix} r_1(k) \\ r_2(k) \end{bmatrix} + \begin{bmatrix} 0 \\ 1 \end{bmatrix} in\_1$$

where r2 is a first runout cancellation state variable, r1 is a second runout cancellation state variable k is a servo sample number relative to the index wedge, θ is a frequency control parameter proportional to an angular velocity of the multiple rotating recording surfaces, and in 1 is the position error signal.

5. The method of claim 1 wherein the first table further comprises a table of state variables.

6. The method of claim 5 wherein the state variables further comprise the state variables $r_1(k)$ and $r_2(k)$ where r2 is a first runout cancellation state variable, r1 is a second runout cancellation state variable, and k is a servo sample number relative to the index wedge.

7. The method of claim 1 wherein the second table of state variables is indexed by read/write head number.

8. The method of claim 7 wherein the second table further comprises values for r1(k) and r2(k) for the index wedge where r2 is a first runout cancellation state variable, r1 is a second runout cancellation state variable, and k is a servo sample number relative to the index wedge.

9. The method of claim 1 wherein the third table (rrotbl) further comprises:

rrotbl(1)=0 rrotbl(2)=1 rrotbl(k+2)=rrotbl(k)+2cos $k\theta$ $k$=1,2, ... $N$−1 where rrotbl() is an entry in the third table indexed to a servo sample relative to the index wedge, k is the servo sample number, N is the number of samples in one period, and θ is a frequency control parameter proportional to an angular velocity of the multiple rotating recording surfaces.

10. The method of claim 1 wherein the third table further comprises a sine table (SinTbl), the sine table further comprising:

| 0 | Sinθ | Sin2θ | Sin3θ ... Sin[(N − 1)θ] where N is the number | of sample periods.

11. The method of claim 10 wherein the updated values for the multi-dimensional state variable after a head switch comprises the following equation:

$$\begin{bmatrix} r_1(k+n) \\ r_2(k+n) \end{bmatrix} = \frac{1}{\sin\theta} \begin{bmatrix} -\text{SinTbl}(n) & \text{SinTbl}(n+1) \\ -\text{SinTbl}(n+1) & \text{SinTbl}(n+1) \end{bmatrix} \begin{bmatrix} r1(k) \\ r2(k) \end{bmatrix}$$

where r2 is a first runout cancellation state variable, r1 is a second runout cancellation state variable, k is a servo sample number for the index wedge, and n is a servo sample number relative to the index wedge for a new head.

12. The method of claim 1 wherein the first runout cancellation variable comprises the position error signal.

13. The method of claim 1 wherein the second runout cancellation variable comprises a voice coil motor coil current control signal.

14. The method of claim 1 wherein the first head and the second head are actuated by a voice coil motor driven actuator.

15. The method of claim 1 wherein the multiple rotating recording surfaces further comprise magnetic disks.

16. In a disk drive having a sampled signal head positioning servo system apparatus comprising a first head and a second head and multiple rotating recording surfaces wherein each recording surface has multiple sequentially-active servo wedges, and wherein, during track following operations, including such operations during which a head switch occurs, the sampled signal head positioning servo system apparatus produces a position error signal and a control signal for use in minimizing the position error signal and includes a programmable processor for repeatedly calculating, at a servo sample rate, an updated value for the control signal based on a current value of the position error signal, the apparatus comprising:

a) a first table for values for a multi-dimensional state variable, the first table being readable and writable by the programmable processor for use at the servo sample rate in repeatedly calculating the updated value for the control signal during a track following operation;

b) a second table for values for the multi-dimensional state variable, the values being readable by the programmable processor for use in an initialization operation performed when a head switch occurs;

c) means for generating selected coefficients readable by the programmable processor;

d) a first predetermined location for storing a current value for a first runout cancellation variable;

e) a second predetermined location for storing a current value for a second runout cancellation variable;

f) means for identifying a predetermined one of the multiple sequentially-active servo wedges to serve as an index wedge;

g) means for repeatedly performing an updating operation during a track following operation wherein each updating operation including producing an updated value for runout cancellation by reading the first table and the first predetermined location to provide operands to calculate updated values for the multi-dimensional state variable and to calculate an updated value for the second runout cancellation variable, and writing the updated values for the multi-dimensional state variable to replace previous values in the first table;

h) means for detecting when a head switch occurs from the first head to the second head;

i) means for performing the initialization operation by producing a calculated address to the second table indexed by the second head;

j) means for reading from the calculated address to the second table to obtain selected operands; and k) means for using the selected coefficients and the selected operands to calculate updated values for the multi-dimensional state variable.

17. The apparatus of claim 16 wherein the programmable processor further comprises a digital signal processor.

18. The apparatus of claim 16 wherein the disk drive comprises a SCSI drive.

19. The apparatus of claim 16 wherein the means for calculating updated values for the multi-dimensional state variable further comprises a processor implementing the following equation:

$$\begin{bmatrix} r_1(k+1) \\ r_2(k+1) \end{bmatrix} = \begin{bmatrix} 0 & 1 \\ -1 & 2\cos\theta \end{bmatrix} \begin{bmatrix} r_1(k) \\ r_2(k) \end{bmatrix} + \begin{bmatrix} 0 \\ 1 \end{bmatrix} in\_1$$

where r2 is a first runout cancellation state variable, r1 is a second runout cancellation state variable, k is a servo sample number relative to the index wedge, θ is a frequency control parameter proportional to an angular velocity of the multiple rotating recording surfaces, and in 1 is the position error signal.

20. The apparatus of claim 16 wherein the multi-dimensional state variable further comprises the state variables $r_1(k)$ and $r_2(k)$.

21. The apparatus of claim 16 wherein the second table is indexed by a read/write head number where the read/write head number is a reference number for addressing the read/write head.

22. The apparatus of claim 16 wherein the means for generating selected coefficients further comprises a table (rrotbl), wherein the rrotbl further comprises:

rrotbl(1)=0 rrotbl(2)=1 rrotbl(k+2)=rrotbl(k)+2cos $k\theta$ $k$=1,2, ... $N$−1 where rrotbl() is an entry in the third table indexed to a servo sample relative to the index wedge, k is the sample number, N is the number of samples in one period, and θ is a frequency control parameter proportional to an angular velocity of the multiple rotating recording surfaces.

23. The apparatus of claim 16 wherein the means for generating selected coefficients comprises a sine table (SinTbl), wherein the sine table further comprises:

| |
|---|
| 0   Sinθ   Sin2θ   Sin3θ . . . Sin[(N − 1)θ] where N is the number | of sample periods.

24. The apparatus of claim 23 wherein the means for calculating updated values for the multi-dimensional state variable after a head switch comprises the programmable processor implementing the following equation:

$$\begin{bmatrix} r_1(k+n) \\ r_2(k+n) \end{bmatrix} = \frac{1}{\sin\theta} \begin{bmatrix} -\text{SinTbl}(n) & \text{SinTbl}(n+1) \\ -\text{SinTbl}(n+1) & \text{SinTbl}(n+1) \end{bmatrix} \begin{bmatrix} r1(k) \\ r2(k) \end{bmatrix}$$

where r2 is a first runout cancellation state variable, r1 is a second runout cancellation state variable, k is a servo sample number for the index wedge, and n is a servo sample number relative to the index wedge for a new head.

25. The apparatus of claim 16 wherein the second table further comprises values for r1(k) and r2(k) for the index wedge, where r2 is a first runout cancellation state variable, r1 is a second runout cancellation state variable, k is a servo sample number relative to the index wedge.

26. The apparatus of claim 16 wherein the first runout cancellation variable comprises the position error signal.

27. The apparatus of claim 16 wherein the second runout cancellation variable comprises a voice coil motor coil current control signal.

28. The apparatus of claim 16 wherein the first head and the second head are actuated by a voice coil motor driven actuator.

29. The apparatus of claim 16 wherein the multiple rotating recording surfaces further comprise magnetic disks.

* * * * *